United States Patent
Mulrooney

(10) Patent No.: US 12,447,298 B2
(45) Date of Patent: Oct. 21, 2025

(54) DEVICES AND METHODS FOR TREATMENT OF VENTILATOR ASSOCIATED DYSPHAGIA

(71) Applicant: Phagenesis Limited, Manchester (GB)

(72) Inventor: Conor Mulrooney, Manchester (GB)

(73) Assignee: Phagenesis Limited, Manchester (GB)

( * ) Notice: Subject to any disclaimer, the term of this patent is extended or adjusted under 35 U.S.C. 154(b) by 361 days.

(21) Appl. No.: 18/313,289

(22) Filed: May 5, 2023

(65) Prior Publication Data

US 2023/0302244 A1    Sep. 28, 2023

Related U.S. Application Data

(63) Continuation of application No. 15/779,566, filed as application No. PCT/GB2016/053628 on Nov. 22, 2016, now abandoned.

(30) Foreign Application Priority Data

Nov. 26, 2015  (GB) ...................... 1520900

(51) Int. Cl.
  *A61N 1/00*   (2006.01)
  *A61M 16/04*  (2006.01)
  *A61N 1/05*   (2006.01)

(52) U.S. Cl.
  CPC ........ *A61M 16/04* (2013.01); *A61M 16/0402* (2014.02); *A61N 1/0519* (2013.01); *A61N 1/0548* (2013.01); *A61M 2205/054* (2013.01)

(58) Field of Classification Search
  None
  See application file for complete search history.

(56) References Cited

U.S. PATENT DOCUMENTS

| | | | |
|---|---|---|---|
| 803,464 A | 10/1905 | Beck |
| 1,032,436 A | 7/1912 | Smith |
| 2,627,096 A | 2/1953 | Alessi |
| 2,779,985 A | 2/1957 | Turner et al. |
| 3,179,995 A | 4/1965 | Hawk |

(Continued)

FOREIGN PATENT DOCUMENTS

| CA | 2594296 A1 | 3/2006 |
|---|---|---|
| CN | 203389196 U | 1/2014 |

(Continued)

OTHER PUBLICATIONS

Wilmskoetter, Janina, et al., "Cortical and Subcortical Control of Swallowing—Can We Use Information From Lesion Locations to Improve Diagnosis and Treatment for Patients With Stroke?", American journal of speech-language pathology vol. 29,2S (2020): 1030-1043. (Year: 2020).

(Continued)

*Primary Examiner* — Niketa Patel
*Assistant Examiner* — Anant A Gupta
(74) *Attorney, Agent, or Firm* — Fortem IP LLP

(57) ABSTRACT

The present disclosure describes an endotracheal ventilator tube for the treatment of dysphagia comprising an elongate tube and at least one electrode positioned on or about the elongate tube, wherein the at least one electrode is configured to deliver electrical stimulation to the oropharyngeal region and is electrically connected to an electrical stimulation generating means.

20 Claims, 2 Drawing Sheets

(56) References Cited

U.S. PATENT DOCUMENTS

| | | |
|---|---|---|
| 3,630,195 A | 12/1971 | Santomieri |
| 3,839,841 A | 10/1974 | Amplatz |
| 3,894,706 A | 7/1975 | Mizusawa |
| 3,951,136 A | 4/1976 | Wall |
| 4,025,015 A | 5/1977 | Kolic |
| 4,295,618 A | 10/1981 | Morota et al. |
| 4,381,011 A | 4/1983 | Somers |
| 4,453,545 A | 6/1984 | Inoue |
| 4,531,937 A | 7/1985 | Yates |
| 4,691,883 A | 9/1987 | Kurihara |
| 4,707,906 A | 11/1987 | Posey |
| 4,776,349 A | 10/1988 | Nashef et al. |
| 4,840,337 A | 6/1989 | Zaugg |
| 4,960,412 A | 10/1990 | Fink |
| 5,109,870 A | 5/1992 | Silny et al. |
| 5,125,904 A | 6/1992 | Lee |
| 5,147,315 A | 9/1992 | Weber |
| 5,179,952 A | 1/1993 | Buinevicius et al. |
| 5,201,903 A | 4/1993 | Corbett et al. |
| 5,372,131 A | 12/1994 | Heinen |
| 5,382,239 A | 1/1995 | Orr et al. |
| 5,389,074 A | 2/1995 | Parker et al. |
| 5,457,852 A | 10/1995 | Liu |
| 5,551,953 A | 9/1996 | Lattin et al. |
| 5,588,424 A | 12/1996 | Insler et al. |
| 5,755,225 A | 5/1998 | Hutson |
| 5,759,490 A | 6/1998 | Malchesky |
| 5,762,638 A | 6/1998 | Shikani et al. |
| 5,800,402 A | 9/1998 | Bierman |
| 5,836,895 A | 11/1998 | Ramsey |
| 5,957,968 A | 9/1999 | Belden et al. |
| 6,006,138 A | 12/1999 | Don |
| 6,148,222 A | 11/2000 | Ramsey |
| 6,259,938 B1 | 7/2001 | Zarychta et al. |
| 6,266,548 B1 | 7/2001 | Lamade et al. |
| 6,366,813 B1 | 4/2002 | Dilorenzo |
| 6,464,697 B1 | 10/2002 | Edwards et al. |
| 6,484,053 B2 | 11/2002 | Leelamanit et al. |
| 6,611,699 B2 | 8/2003 | Krueger |
| 6,613,025 B1 | 9/2003 | Palasis |
| 6,658,294 B1 | 12/2003 | Zadeh et al. |
| 6,804,866 B2 | 10/2004 | Lemke et al. |
| 6,856,822 B2 | 2/2005 | Larsson |
| 7,324,851 B1 | 1/2008 | Dilorenzo |
| 7,598,839 B1 | 10/2009 | Wedley |
| 7,871,430 B2 | 1/2011 | Pavcnik et al. |
| 7,918,828 B2 | 4/2011 | Lundgaard et al. |
| 8,048,062 B2 | 11/2011 | Adams et al. |
| 8,092,433 B2 | 1/2012 | Hamdy |
| 8,876,798 B2 | 11/2014 | Clark et al. |
| 8,968,331 B1 | 3/2015 | Sochor |
| 9,895,486 B1 | 2/2018 | Carey-Hench |
| 9,982,742 B2 | 5/2018 | Loewe et al. |
| 10,028,885 B2 | 7/2018 | Martin et al. |
| 10,285,341 B2 | 5/2019 | McCaslin et al. |
| 10,743,810 B2 | 8/2020 | Mulrooney |
| 10,888,690 B2 | 1/2021 | Mulrooney |
| 11,617,881 B2 | 4/2023 | Mulrooney et al. |
| 11,980,753 B2 | 5/2024 | Mulrooney et al. |
| 11,992,681 B2 | 5/2024 | Mulrooney |
| 2001/0039413 A1 | 11/2001 | Bowe |
| 2001/0054425 A1 | 12/2001 | Bertram |
| 2002/0032468 A1 | 3/2002 | Hill et al. |
| 2002/0065544 A1 | 5/2002 | Smits |
| 2002/0165537 A1 | 11/2002 | Kelley et al. |
| 2002/0177765 A1 | 11/2002 | Bowe et al. |
| 2003/0036794 A1 | 2/2003 | Ragheb et al. |
| 2004/0034396 A1 | 2/2004 | Asmar et al. |
| 2004/0073110 A1 | 4/2004 | Stewart et al. |
| 2004/0162584 A1* | 8/2004 | Hill ............... A61N 1/0519 607/3 |
| 2004/0220645 A1 | 11/2004 | Kretschmer et al. |
| 2004/0230162 A1 | 11/2004 | Tan |
| 2005/0098688 A1 | 5/2005 | Miarka et al. |
| 2005/0137459 A1 | 6/2005 | Chin et al. |
| 2005/0146676 A1 | 7/2005 | Silvestro |
| 2005/0192559 A1 | 9/2005 | Michels et al. |
| 2005/0229933 A1 | 10/2005 | McGrail et al. |
| 2006/0085049 A1 | 4/2006 | Cory et al. |
| 2007/0074728 A1 | 4/2007 | Rea |
| 2007/0089898 A1 | 4/2007 | Potter |
| 2007/0156041 A1 | 7/2007 | Rea |
| 2008/0009810 A1 | 1/2008 | Hamdy |
| 2008/0147013 A1 | 6/2008 | Breton et al. |
| 2008/0249507 A1 | 10/2008 | Hadani |
| 2008/0255441 A1 | 10/2008 | Hadani |
| 2008/0300530 A1 | 12/2008 | Massengale |
| 2009/0062772 A1 | 3/2009 | Wakeford et al. |
| 2009/0223698 A1 | 9/2009 | Gilliland et al. |
| 2009/0275825 A1 | 11/2009 | Thomas |
| 2009/0276025 A1 | 11/2009 | Burnes et al. |
| 2010/0115739 A1 | 5/2010 | Mathur |
| 2010/0170066 A1 | 7/2010 | Honeycutt |
| 2010/0174170 A1 | 7/2010 | Razavi |
| 2010/0206453 A1 | 8/2010 | Leeflang et al. |
| 2010/0218975 A1 | 9/2010 | Mehan |
| 2010/0317956 A1 | 12/2010 | Kartush |
| 2011/0137374 A1 | 6/2011 | Kieval et al. |
| 2011/0210215 A1 | 9/2011 | Nitsche et al. |
| 2011/0251519 A1 | 10/2011 | Romoscanu |
| 2012/0065469 A1 | 3/2012 | Allyn et al. |
| 2012/0203058 A1 | 8/2012 | Kanapkey et al. |
| 2012/0259208 A1 | 10/2012 | Bloom et al. |
| 2012/0260921 A1 | 10/2012 | Sangwan |
| 2013/0006323 A1* | 1/2013 | Tal ............... A61N 1/36007 607/40 |
| 2013/0197321 A1 | 8/2013 | Wilson |
| 2013/0282078 A1 | 10/2013 | Wacnik |
| 2014/0000622 A1 | 1/2014 | Azagury et al. |
| 2014/0012235 A1 | 1/2014 | Pinchuk et al. |
| 2014/0128936 A1 | 5/2014 | Laufer et al. |
| 2014/0276663 A1 | 9/2014 | Pinchuk et al. |
| 2014/0288382 A1 | 9/2014 | Lemmens et al. |
| 2014/0288384 A1* | 9/2014 | Mulrooney ............ A61B 5/037 607/116 |
| 2014/0303617 A1 | 10/2014 | Shimada |
| 2014/0378941 A1 | 12/2014 | Su et al. |
| 2015/0224280 A1 | 8/2015 | Pinchuk et al. |
| 2017/0050014 A1 | 2/2017 | Rizik |
| 2017/0224986 A1 | 8/2017 | Imran et al. |
| 2017/0312497 A1 | 11/2017 | Mulrooney et al. |
| 2018/0214672 A1 | 8/2018 | Mulrooney |
| 2018/0235533 A1 | 8/2018 | Mulrooney |
| 2019/0038894 A1 | 2/2019 | Bassi et al. |
| 2019/0134380 A1 | 5/2019 | Mulrooney |
| 2019/0134389 A1 | 5/2019 | Mulrooney |
| 2020/0061369 A1 | 2/2020 | Mulrooney et al. |
| 2020/0061370 A1 | 2/2020 | Mulrooney et al. |
| 2020/0179045 A1 | 6/2020 | Levin et al. |
| 2020/0306528 A1 | 10/2020 | Linden et al. |
| 2020/0330025 A1 | 10/2020 | Mulrooney |
| 2021/0077784 A1 | 3/2021 | Mulrooney |
| 2021/0077808 A1 | 3/2021 | Mulrooney et al. |
| 2022/0160537 A1 | 5/2022 | Mulrooney |
| 2022/0161029 A1 | 5/2022 | Mulrooney |
| 2022/0161030 A1 | 5/2022 | Mulrooney |
| 2022/0313981 A1 | 10/2022 | Mulrooney |
| 2023/0181023 A1 | 6/2023 | Mulrooney |
| 2023/0405324 A1 | 12/2023 | Mulrooney |
| 2024/0009451 A1 | 1/2024 | Mulrooney |
| 2024/0299746 A1 | 9/2024 | Mulrooney |

FOREIGN PATENT DOCUMENTS

| | | |
|---|---|---|
| CN | 203954394 U | 11/2014 |
| CN | 204319485 U | 5/2015 |
| EP | 0510857 A1 | 10/1992 |
| EP | 0571514 A1 | 12/1993 |
| EP | 1179307 A2 | 2/2002 |
| EP | 2253350 A1 | 11/2010 |
| EP | 2693968 A1 | 2/2014 |
| EP | 3331597 A1 | 6/2018 |
| GB | 2169206 A | 7/1986 |
| GB | 2254253 A | 10/1992 |

(56) References Cited

FOREIGN PATENT DOCUMENTS

| | | |
|---|---|---|
| GB | 2294642 A | 5/1996 |
| GB | 2313316 A | 11/1997 |
| GB | 2532044 A | 5/2016 |
| GB | 2541039 A | 2/2017 |
| JP | S63200771 A | 8/1988 |
| JP | 5115563 A | 5/1993 |
| JP | H05115563 A | 5/1993 |
| JP | H07500523 A | 1/1995 |
| JP | H08505291 A | 6/1996 |
| JP | 2556694 B2 | 11/1996 |
| JP | H10118190 A | 5/1998 |
| JP | 2005312969 A | 11/2005 |
| JP | 2012512722 A | 6/2012 |
| JP | 2014068716 A | 4/2014 |
| WO | 9400050 A1 | 1/1994 |
| WO | 9405361 A1 | 3/1994 |
| WO | 9526777 A1 | 10/1995 |
| WO | 9715349 A1 | 5/1997 |
| WO | 9719667 A1 | 6/1997 |
| WO | 03026741 A1 | 4/2003 |
| WO | 2005051472 A2 | 6/2005 |
| WO | 2006024825 A1 | 3/2006 |
| WO | 2007129002 A1 | 11/2007 |
| WO | 2009154718 A1 | 12/2009 |
| WO | 2010023579 A1 | 3/2010 |
| WO | 2010071812 A1 | 6/2010 |
| WO | 2010091440 A2 | 8/2010 |
| WO | 2012131303 A1 | 10/2012 |
| WO | 2013109835 A1 | 7/2013 |
| WO | 2014152808 A1 | 9/2014 |
| WO | 2015027094 A1 | 2/2015 |
| WO | 2017089752 A1 | 6/2017 |
| WO | 2022106843 A1 | 5/2022 |
| WO | 2022106844 A1 | 5/2022 |

OTHER PUBLICATIONS

Bath et al., Pharyngeal electrical stimulation for neurogenic dysphagia following stroke, traumatic brain injury or other causes: Main results from the PHADER cohort study, EClinical Medicine 28 (2020) 100608, 9 pages.

Bath et al., Pharyngeal Electrical Stimulation for Treatment of Dysphagia in Subacute Stroke A Randomized Controlled Trial, Stroke, Jun. 2016, vol. 47, Issue 6, pp. 1562-1570.

Dziewas et al., Design and implemental of Pharyngeal electrical Stimulation for early de-cannulation in TRACheotomized (PHAST-TRAC) stroke patients with neurogenic dysphagia, International Journal of Stroke, 12(4), 2017, pp. 430-437.

Dziewas et al., PHAryngeal electrical STimulation for early decannulation in TRACheotomised patients with neurogenic dysphagia after stroke (PHAST-TRAC): a prospective, single-blinded, randomised trial, Lancet Neurology, vol. 17, Issue 10, 2018, 29 pages.

Essa et al., The BDNF polymorphism VAL66Met may be predictive of swallowing improvement post pharyngeal electrical stimulation in dysphagic stroke patients, Neurogastroenterol Motil, 2017; 27, 7 pages.

Fraser et al., Differential changes in human pharyngoesophageal motor excitability induced by swallowing, pharyngeal stimulation, and anesthesia, Am J Physiol Gastrointest Liver Physiol, 285: G-137-G144, 2003.

Hamdy et al., The cortical topography of human swallowing musculature in health and disease, Nature Medicine, vol. 2, No. 11, Nov. 1996, pp. 1217-1224.

Hamdy, et al., Long-term reorganization of human motor cortex driven by short-term sensory stimulation, Nature Neuroscience, vol. 1, No. 1, May 1998, pp. 64-68.

Jayasekeran et al., Adjunctive Functional Pharyngeal Electrical Stimulation Reverses Swallowing Disability After Brain Lesions, Gastroenterology, 2010; vol. 138, No. 5, pp. 1737-1746.

Koestenberger, et al., A Pilot Study of Pharyngeal Electrical Stimulation of Orally Intubated ICU Patients with Dysphagia, Neurocrit Care (2020) 32: 532-538.

Magara et al., Tu1254 Does Combining Pharyngeal Electrical Stimulation With Simultaneous Swallowing of Carbonated Liquids Enhance the Cortical Swallowing Motor System?, Gastroenterology, Apr. 2016 [Abstract only].

Magara, et al., Exploring the effects of synchronous pharyngeal electrical stimulation with swallowing carbonated water on cortical excitability in the human pharyngeal motor system, Neurogastroenterol Motil (2016), 11 pages.

Restivo et al., Pharyngeal electrical stimulation device for the treatment of neurogenic dysphagia: technology update, Medical Devices: Evidence and Research, 2018: 11, pp. 21-26.

Restivo et al., Pharyngeal Electrical Stimulation for Dysphagia Associated with Multiple Sclerosis: A Pilot Study, Brain Stimulation, Jun. 2013, pp. 418-423.

Sasegbon et al., Advances in the Use of Neuromodulation for Neurogenic Dysphagia: . . . , American Journal of Speech-Language Pathology, Jul. 2020, vol. 29, pp. 1044-1064.

Scutt, et al., Pharyngeal Electrical Stimulation for Treatment of Poststroke Dysphagia: Individual Patient Data Meta-Analysis of Randomised Controlled Trials, Stroke Research and Treatment, 2015, 8 pages.

Search Report dated Apr. 28, 2016 for Patent Application No. GB1520900.0; 1 page.

Search Report dated Sep. 29, 2016 for Patent Application No. GB1520900.0; 2 pages.

Suntrup et al., Electrical pharyngeal stimulation for dysphagia treatment in tracheotomized stroke patients: a randomized controlled trial, Intensive Care Med (2015) 41: 1629-1637.

Suntrup-Krueger et al., Electrical pharyngeal stimulation increases substance P level in saliva, Neurogastroenterol Motil (2016) 28, pp. 855-860.

Vasant et al., Pharyngeal Electrical Stimulation in Dysphagia Poststroke: A Prospective, Randomized Single-Blinded Interventional Study, Neurorehabilitation and Neural Repair, 2016, vol. 30(9), pp. 866-875.

Fraser, Chris , et al., "Driving Plasticity in Human Adult Motor Cortex is Associated with Improved Motor Function After Brain Injury", Neuron, vol. 34, May 30, 2002, pp. 831-840.

Gow, David , et al., "Characterising the Central Mechanisms of Sensory Modulation in Human Swallowing Motor Cortex", Clinical Neurophysiology, Elsevier Science, IE, vol. 115, No. 10, Jun. 26, 2004, pp. 2382-2390.

Hamdy, S. , et al., "Modulation of human swallowing behaviour by thermal and chemical stimulation in health and after brain injury", Neurogastroenterol Motil, vol. 15, No. 1, Feb. 2003, pp. 69-77.

Hamdy, Shaheen , et al., "Recovery of Swallowing After Dysphagic Stroke Relates to Functional Reorganization in the Intact Motor Cortex", Gastroenterology, vol. 115, No. 5, Nov. 1998, pp. 1104-1112.

Jasper, Herbert H., "The Ten Twenty Electrode System of the International Federation", Clinical Neurophysiol, vol. 10, pp. 370-375.

Kajii, Yuka , et al., "Sour taste stimulation facilitates reflex swallowing from the pharynx and larynx in the rat", Physiology & Behavior, vol. 77, No. 2-3, 2002, pp. 321-325.

Takeuchi, Hiro-Aki , et al., "Electrophysiological and Behavioral Studies of Taste Discrimination in the Axolotl (*Ambystoma mexicanum*)", Physiology & Behavior, vol. 56, No. 1, Jul. 1994, pp. 121-127.

Tutuian, R. , et al., "Effects of position on oesophageal function: studies using combined manometry and multichannel intraluminal impedance", Neurogastroenterol Motil., vol. 15, No. 1, Feb. 2003, pp. 63-67.

Wassermann, Eric M., "Risk and safety of repetitive transcranial magnetic stimulation: report and suggested guidelines from the International Workshop on the Safety of Repetitive Transcranial Magnetic Stimulation, Jun. 5-7, 1996", Electroencephalography and clinical Neurophysiology, vol. 108,, 1998, pp. 1-16.

Takeishi, et al., "Effects of Pharyngeal Electrical Stimulation on Swallowing Performance", PLOS One 13(1):e0190608. https://doi.org/10.1371/journal.pone.0190608 (Year: 2018).

* cited by examiner

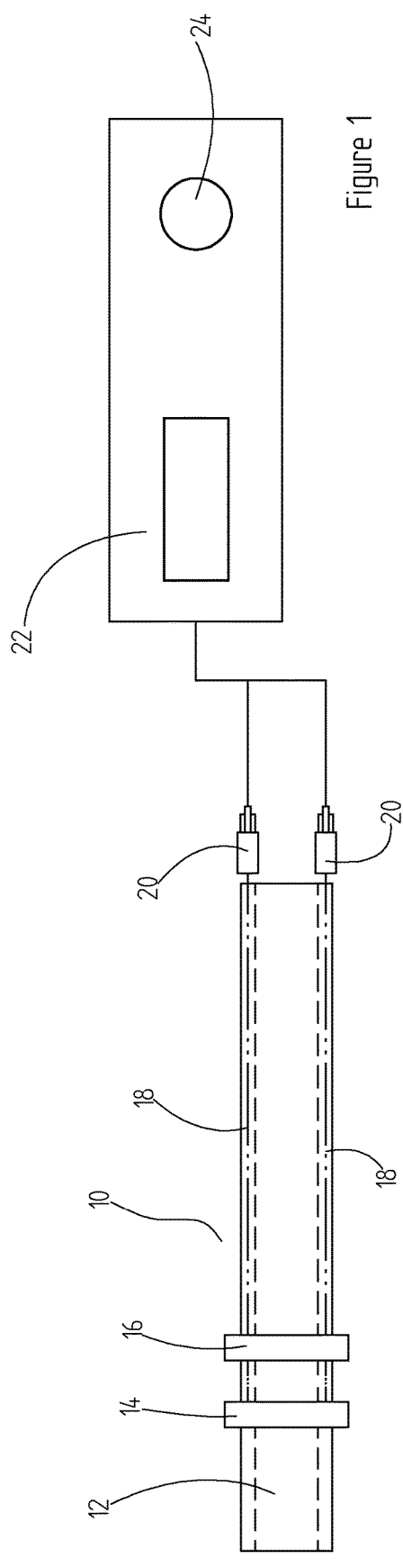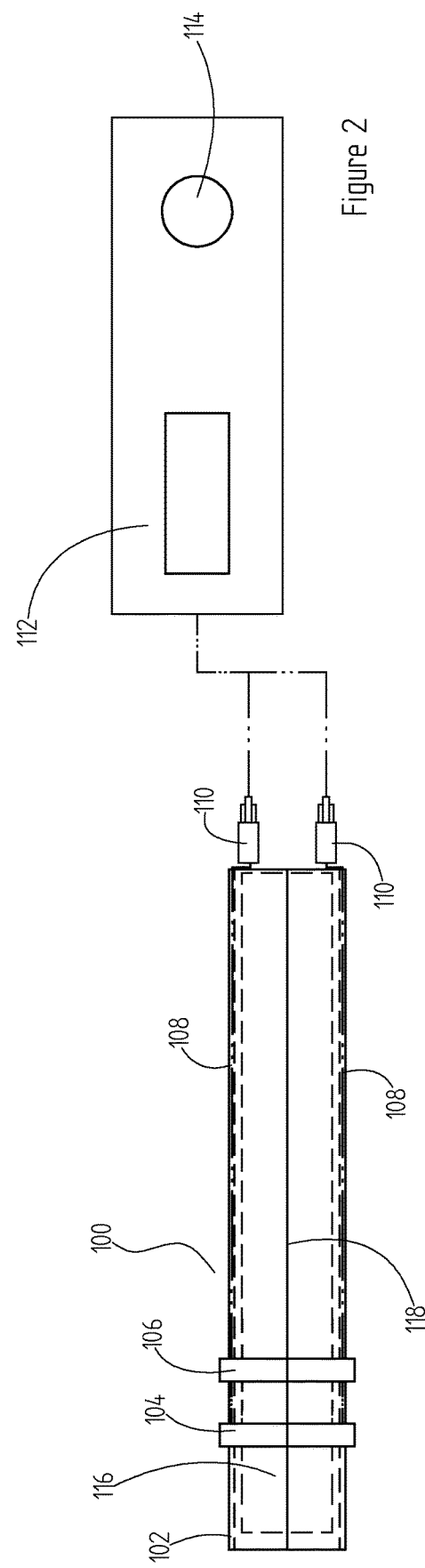

DEVICES AND METHODS FOR TREATMENT OF VENTILATOR ASSOCIATED DYSPHAGIA

CROSS-REFERENCE TO RELATED APPLICATIONS

This application is a continuation of U.S. application Ser. No. 15/779,566, filed May 29, 2018, which is a 371 national phase application of International Application No. PCT/GB2016/053628, filed Nov. 22, 2016, which claims the priority of GB Patent Application No. 1520900.0, filed Nov. 26, 2015, each of which is incorporated herein by reference in its entirety.

FIELD

The present invention relates to devices and methods for the treatment of Ventilator Associated Dysphagia (from hereonin referred to as VAD).

BACKGROUND

Dysphagia can be defined as a difficulty or inability to swallow effectively or safely. Dysphagia is not a disease, it is a symptom associated with many different types of diseases or medical conditions.

Research suggests that 7%-10% of all adults older than 50 years have reported a significant swallowing problem. Of those over the age of 60, it has been reported that over 14% of the entire adult population has some degree of swallowing dysfunction (ASHA 2008). In total, 10 million Americans are evaluated each year in clinics and hospitals for swallowing difficulties. It has also been reported that >51% of institutionalised elderly patients present with oropharyngeal dysphagia.

Collectively these figures reflect the fact that neurogenic dysphagia can develop due to a very wide range of underlying conditions such as traumatic brain injury, cerebral palsy and neurodegenerative diseases like MS, Parkinson's and Alzheimer's. It is however stroke that is probably the most recognized single cause of dysphagia—greater than 50% of patients who have a stroke will present with dysphagia.

Complications that have been associated with dysphagia post-stroke include pneumonia, malnutrition, dehydration, poorer long-term outcome, increased length of hospital stay, increased rehabilitation time and the need for long-term care assistance, increased mortality, and increased health care costs. These complications impact the physical and social well being of patients, quality of life of both patients and caregivers, and the utilization of health care resources.

Collectively the underlying conditions described above have a common aspect—the dysphagia associated with them is due to disruption of the control centres in the brain that are responsible for modulating or coordinating swallowing activities. For this reason they can be described as neurogenic dysphagia. There are other types of dysphagia that are related to local physical trauma or physical abnormalities in the tissues or musculature involved in the swallowing process itself. In these cases the centres of the brain involved in the modulation or control of swallowing are likely to be undamaged. This type of dysphagia would not be described as neurogenic dysphagia.

There is a third class of dysphagia, referred to in this specification as VAD. VAD arises when swallowing mechanisms (both neurological and physiological) are initially intact but over time become compromised or cease to function correctly as a result of the patient being mechanically ventilated.

In many cases mechanical ventilation is carried out for reasons unrelated to the swallowing capability of the patient. It is normal for example following cardiac surgery for patients to be mechanically ventilated. Whilst the majority of patients are successfully extubated, i.e. the mechanical ventilation is removed, within 6 to 8 hours after the procedure, a large number of patients requiring mechanical ventilation still remain in intensive care for between 24 and 48 hours. Patients may also be mechanically ventilated due to respiratory failure secondary to chronic obstructive pulmonary disease, pneumonia, sepsis or cardiovascular failure, for example.

There is a known association between mechanical ventilation and dysphagia, and prolonged mechanical ventilation in particular can be an independent predictor of dysphagia. There have been a number of studies investigating the association between prolonged mechanical ventilation and dysphagia, some reporting an incidence as high as 83% of those assessed.

The reasons why previously unaffected patients develop dysphagia as a side effect of mechanical ventilation are unclear. There appear to be many different factors that contribute to the risk and severity of swallowing dysfunction including tissue injury, direct physical effects, co-morbidities, atrophy and desynchronisation as discussed in more detail below.

Mechanical ventilation is performed using tracheal tubes of which there are two types: endotracheal tubes that are introduced orally (orotracheal) or nasally (nasotracheal), or, tracheostomy tubes that are introduced via a tracheostomy, i.e. an incision directly into a patient's trachea. Both classes of tube are designed to be connected as required to a mechanical ventilator that can maintain supply of the necessary gases to the patient's lungs. Endotracheal tubes are designed primarily to provide a means to mechanically ventilate or provide a safe airway for patients who have either compromised respiratory function or dysphagia. They may also be used in anaesthesiology.

Most endotracheal tubes are provided as sterile disposable units. They are generally made from PVC with an internal diameter ranging from 2-10.5 mm. In it's simplest form at the proximal end there is a standard connector compatible with machine ventilators and at the distal end are ports or openings to allow passage of gases into the lungs. There is also usually an inflatable balloon or cuff designed to provide a seal at the entrance to the airways at a location below the vocal cords. There are endotracheal tube variants that include a variety of additional features—suction ports and channels to allow removal of secretions pooled above the cuff, multiple channel tubes to allow selective inflation or deflation of lungs, reinforced or preformed tubes to facilitate positioning or tolerability and tubes made of alternative materials such as silicone.

Tracheostomy tubes are introduced via a tracheostomy. They generally comprise an outer cannula designed to maintain the opening into the trachea and an inner cannula. The outer cannula has a faceplate and this is where the ties or sutures are connected to secure the tube in place. The inner cannula can be cleaned or disposed of as required. The tube is usually of the order of 75 mm in length. As with the endotracheal tubes there is generally an inflatable cuff to prevent ingress of secretions. Another common feature of tracheostomy tubes, an obturator, is a curved device designed to facilitate placement/introduction and is removed once the outer cannula is correctly in position. The obturator is then replaced by the inner cannula.

Initial passage of an endotracheal tube used in mechanical ventilation can often give rise to a type of tissue injury known as glottic injury. Over time a tracheotomy can give rise to fibrosis that may also impact local tissue function. Ulceration of the vocal cords and laryngeal oedema are also common with translaryngeal mechanical ventilation. Endotracheal tubes can also directly interfere with swallowing by decreasing the elevation and anterior displacement of the larynx or by compressing the oesophagus.

Chronic idiopathic neuropathy, Parkinson's Disease, Poliomyelitis and many other conditions can contribute to disruption of the neurological component of swallowing function.

Vocal cords show reduced sensitivity and movement in response to thermal stimulation (ice water) after prolonged mechanical ventilation. Sensory deficit in the pharyngeal mucosa may contribute to dysphagia as, after anaesthesia a significant decrease in swallowing speed and capacity can be demonstrated. Reversible swallowing defects seen after prolonged mechanical ventilation have also been claimed to be primarily due to disuse muscle atrophy.

It has been postulated that synchronization of swallowing and breathing may be difficult or compromised for patients receiving volume cycled mechanical ventilation where there is little patient control of the timing and duration of breaths.

Research suggests that VAD may be caused by a combination of factors—local trauma or injury, muscle atrophy and/or changes in neurological sensitivity or responsiveness or co-morbidities. Whilst the root causes of VAD may not be fully understood, it is clear that they are not the same as the root cause of neurogenic dysphagia. In the latter case regardless of the underlying condition the main issue is direct injury to the centers of the brain responsible for swallowing instigation, modulation or control. There is no evidence that the presence of a ventilation tube alone could give rise to this kind of injury in the brain.

Pharyngeal Electrical Stimulation (PES), also referred to herein simply as electrical stimulation, is a treatment recognised as being effective at treating neurogenic dysphagia and is designed to restore functionality in the higher brain centres responsible for swallowing control and coordination. PES involves the delivery of patient specific levels of electrical stimulation to the pharyngeal mucosa. This stimulation acts on sensory nerve clusters in the region (mainly the pharyngeal branches and/or laryngeal and lingual branches of the glossopharyngeal and vagus nerves). The resulting sensory signals pass upwards via afferent pathways through the brainstem and act on the swallow control centres in the motor cortex. The net result of the stimulation is that it facilitates a functional reorganization in the brain such that the majority of activity involved in swallowing coordination and control is moved from the damaged area of the brain to a site on the other side of the brain.

PES requires the positioning of a pair of electrodes in the pharyngeal region and establishing good electrical contact with the pharyngeal mucosa.

Other methods to treat neurogenic dysphagia such as Trancranial Magnetic Stimulation (TMS), and Transcranial Direct Current Stimulation (tDCS) apply their stimulation to the motor cortex. They are limited in that they require an understanding of which part of the brain has been affected and in the case of TMS can only apply stimulation to one side of the brain at a time. They also require substantial expertise to correctly position and deliver the stimulus in a controlled and safe way and improper use is associated with seizures and scalp burns and potential cross infection risk between patients.

For these alternate methods, in the event that the neurological deficit is not exclusively located in the motor cortex they may be less likely to produce a beneficial effect. By comparison PES has the advantage that by delivering sensory input to the pharynx, base of the tongue and upper laryngeal regions in a manner that is not lateralized, it can provide the kind of local stimulation associated with a conventional swallowing action but at a higher intensity.

The presence of an endotracheal tube creates some technical challenges in delivery of PES—the endotracheal tube may prevent the PES electrodes coming in contact with the target tissues and prevent treatment initiation, or, the electrodes may deliver electrical stimulation to the surface of endotracheal tube thus directing the current away from the target tissue Methods such as TMS and tDCS have the limitations described above but also have a common advantage in that the location of the applied stimulus is remote from the location of the endotracheal or tracheotomy tubes. This means they effectively avoid one of the challenges in delivering PES to patients i.e., unwanted interaction between the catheter for PES treatment delivery and the tubes for providing ventilation.

The association between applied stimulation, induced cortical excitability, functional reorganization and improved clinical outcome has been repeatedly demonstrated in clinical studies in patients with neurogenic dysphagia post stroke. In addition it has been shown that unassisted recovery of swallowing in these patients (i.e., without stimulation treatment) follows the same pattern of functional reorganisation whereby control effectively moves from the area where the damage occurred to non-damaged or healthy brain regions including those on the other side of the brain.

Until now PES has been used exclusively to treat neurogenic dysphagia and has not been recognised as suitable for treatment of other forms of dysphagia with different underlying causes, including VAD.

Whilst the presence of an orotracheal tube may contribute to oropharyngeal dysphagia post extubation, it also serves as a safe airway in the presence of dysphagia. As a result there is a challenge associated with removing the tube as it may at the same time as contributing to the development of the dysphagia be the most effective way of managing the risks associated with the problem.

The present invention seeks to provide solutions to the aforementioned problems.

SUMMARY OF THE INVENTION

Described herein are methods and devices to enable effective treatment of VAD including methods and devices that allow a ventilation tube to be left in place to protect a patient's airway, but also enable the delivery of treatment by way of electrical stimulation. Electrical stimulation of the pharyngeal mucosa provides a sensory input to induce swallowing activity, overcome the effects of tissue trauma and/or atrophy and/or re-establish dormant neurological pathways (in the case of neurogenic dysphagia) and the presence of a ventilation tube provides a means to safely mechanically ventilate the patient, should this be needed. Alternatively, the patient may be fully or partially weaned from the ventilator, and/or the ventilation tube may be removed, prior to electrical stimulation being delivered.

The present invention also provides devices and methods for the delivery of electrical stimulation to patients who are mechanically ventilated. These patients may be suffering from VAD or from other forms of dysphagia, as discussed herein, such as neurogenic dysphagia (for example, where stroke is the primary cause). Treating these patients whilst they are still mechanically ventilated should lead to quicker recovery times and reduce the need for ongoing mechanical ventilation as a means to prevent dysphagia associated respiratory problems.

The presence of an endotracheal tube creates technical challenges to the delivery of electrical stimulation using the methods and devices of the prior art. The endotracheal tube may prevent the electrodes coming in contact with the target tissues and prevent treatment initiation, the electrodes may deliver electrical stimulation to the endotracheal tube directing the current away from the target tissues and into or along the surface of the endotracheal tube.

As used herein the term "Ventilator Associated Dysphagia" or "VAD" refers to dysphagia whose primary cause is mechanical ventilation and/or the presence of the associated mechanical ventilation devices, e.g. an endotracheal or tracheostomy tube.

Given that electrical stimulation of a patient's pharynx has only previously been used for the treatment of neurogenic dysphagia, as frequently caused by stroke, to restore function in the higher centers of the brain that control swallowing, and that there is no evidence that mechanical ventilation gives rise to injury in these areas, it was previously unknown and completely unexpected that electrical stimulation could have any useful effect on the VAD group of patients.

A first aspect of the invention provides an endotracheal ventilator tube for the treatment of dysphagia comprising an elongate tube and at least one electrode positioned on or about the elongate tube, wherein the at least one electrode is configured to deliver electrical stimulation to the oropharyngeal region and is electrically connected to an electrical stimulation generating means.

In one embodiment, the ventilator tube comprises a sleeve selectively positionable around the elongate tube, wherein the at least one electrode is positioned on the sleeve. The sleeve may be split along its length.

In another embodiment the elongate tube defines a pre-curved shape for urging the at least one electrode against target tissue.

A second aspect of the invention provides an endotracheal ventilator tube comprising an elongate tube, wherein the elongate tube comprises at least one channel for receiving a catheter for delivering PES.

A third aspect of the invention provides a method of treating ventilator associated dysphagia, the method comprising: inserting a ventilation tube as claimed in any one of the preceding claims into a patient either orally or nasally; positioning the ventilation tube such that the at least one electrode is located proximate a pre-defined target tissue; and stimulating the pre-defined target tissue by electrical stimulation.

BRIEF DESCRIPTION OF DRAWINGS

The following drawings illustrate embodiments of the present invention.

FIG. 1 illustrates a first embodiment of a device for administering electrical stimulation to a patient's pharyngeal tissue;

FIG. 2 illustrates a second embodiment of a device for administering electrical stimulation to a patient's pharyngeal tissue;

DESCRIPTION

Figure 3:
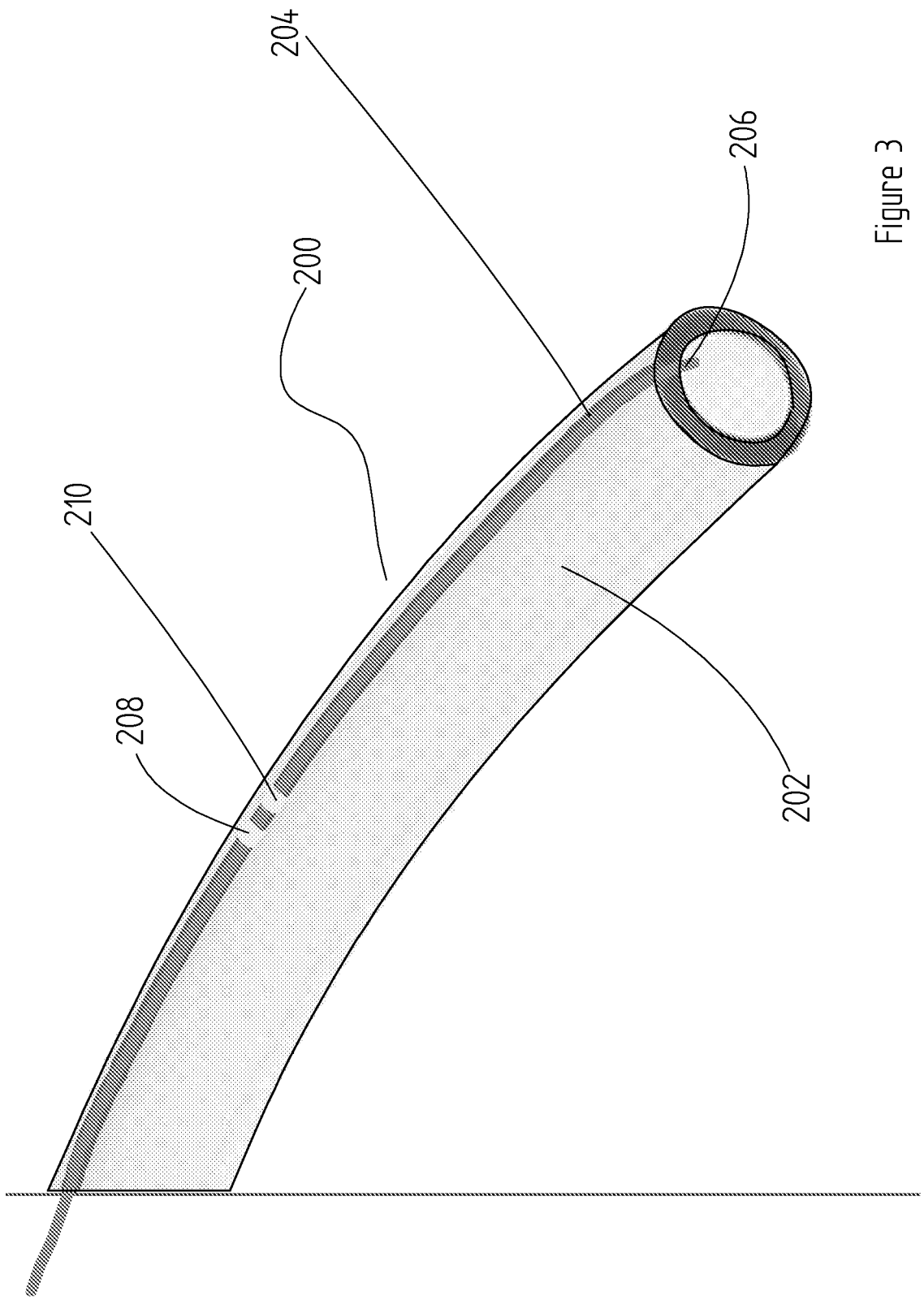
FIG. 3 illustrates a third embodiment of a device for administering electrical stimulation to a patient's pharyngeal tissue.

FIG. 1 shows a first embodiment of a device (10) for administering electrical stimulation to a patient's pharynx. The device (10) comprises a ventilator tube (12) with at least one electrode (14, 16) located on its outer surface in such a position that when the ventilator tube (12) is properly inserted into a patient, the at least one electrode (14, 16) is aligned and in contact with the target pharyngeal mucosa. The device (10) additionally comprises conducting wires (18) located within the walls of the ventilator tube (12) extending from the at least one electrode (14, 16) and terminating at a connector (20) suitable for attachment to a control unit (22).

The control unit (20) comprises electrical current generating means for delivering an electrical current to the at least one electrode (14, 16) and a control interface means (24) for selectively varying the delivered electrical current.

A further feature of this first embodiment is a pre-curved fixed shape that advantageously brings the electrodes into better contact with target pharyngeal mucosa. A further feature of the first embodiment of the device (10) provides a means to selectively change the shape of the ventilator tube, or a portion of the ventilator tube, such that the at least one electrode is brought into better contact with the patient's pharyngeal mucosa. Examples of such means of selectively changing the shape of the ventilator tube include a guide wire inserted longitudinally through the tube or walls of the tube, structures within or inserted into the tube with spring like properties including those with regions of different spring tension along the length of the ventilator tube and also inflatable features (12).

FIG. 2 shows a second embodiment of a device for administering electrical stimulation. The device (100) comprises a sleeve (102) split (118) along its length with at least one electrode (104, 106) located on its outer surface, conducting wires (108) along its length and a connector (110) suitable for attachment to a control unit (112). The control unit (112) comprises electrical current generating means for delivering an electrical current to the at least one electrode (104, 106) and a control interface means (114) for selectively varying the delivered electrical current.

The sleeve (102) is configured such that it can be reversibly positioned around a standard endotracheal ventilator tube (116) and secured in place. The sleeve (102) may also be capable of being moved along the length of the endotracheal ventilator tube (116) and being reversibly fixed into position longitudinally as required in order to position the electrodes (104, 106) optimally. The sleeve (102) may also be capable of being added to or removed from the endotracheal ventilator tube (116) after the endotracheal ventilator tube has been inserted into a patient. The electrodes (104, 106) may be formed from a flexible printed conductive material.

FIG. 3 shows another embodiment of a device for administering electrical stimulation. The device (200) is a pre-curved endotracheal ventilator tube (202) oriented such that the exterior surface of the curve of the endotracheal ventilator tube (202) is substantially in contact with the posterior wall of a patient's pharynx. The device (200) further comprises a channel (204) disposed within the curved surface designed to receive a treatment catheter (206) comprising at least one electrode (208, 210) and urges the at least one electrode (208, 210) into contact with the preferred contact area on the posterior wall of the patient's pharynx. If the treatment catheter (206) is also designed to provide nutritional support it may act to facilitate passage of the tip of the catheter into the oesophagus and onwards to the stomach whether introduced nasally or orally.

The invention claimed is:

1. A method for treating a patient suffering from ventilator-associated dysphagia, the method comprising:
receiving a patient with a distal end portion of an elongate tube positioned within a trachea of the patient and a proximal end portion of the elongate tube extracorporeally positioned and fluidically coupled to a ventilator;
while the distal end portion of the elongate tube is positioned within the trachea and the proximal end portion of the elongate tube is fluidically coupled to the ventilator, positioning a sleeve over the elongate tube, the sleeve being split longitudinally along its length and carrying at least one electrode, wherein the sleeve is positioned over the elongate tube such that the at least one electrode is positioned within a pharynx of the patient in contact with the pharyngeal mucosa; and
stimulating sensory nerves proximate the pharynx via the at least one electrode, thereby reestablishing a functional connection between the sensory nerves and a central nervous system of the patient to improve a swallowing ability of the patient.

2. The method of claim 1, wherein the patient does not have injury to the swallow motor cortex.

3. The method of claim 1, wherein stimulating the sensory nerves overcomes sensory deficit in the pharyngeal mucosa induced by ventilation of the patient.

4. The method of claim 1, wherein stimulating the sensory nerves increases a cortical excitability of the patient to improve the patient's swallowing ability.

5. The method of claim 1, wherein stimulating the sensory nerves provides sensory input to the pharynx, a base of a tongue, and an upper laryngeal region.

6. The method of claim 1, wherein the sleeve is positioned over the elongate tube such that the at least one electrode is positioned within an oropharyngeal region of the pharynx of the patient in contact with the pharyngeal mucosa.

7. The method of claim 1, wherein the sensory nerves include a glossopharyngeal nerve of the patient.

8. The method of claim 1, wherein the sensory nerves include a vagus nerve of the patient.

9. The method of claim 1, further comprising, while stimulating the sensory nerves, delivering a gas from the ventilator to the patient's trachea via a lumen of the elongate tube.

10. The method of claim 1, further comprising, while the sleeve is positioned over the elongate tube, moving the sleeve along a length of the elongate tube.

11. The method of claim 1, further comprising, after positioning the sleeve over the elongate tube and while the distal end portion of the elongate tube is positioned within the trachea and the proximal end portion of the elongate tube is fluidically coupled to the ventilator, separating the sleeve from the elongate tube.

12. The method of claim 1, wherein the elongate tube is curved along its length.

13. The method of claim 1, further comprising, prior to stimulating the sensory nerves, changing a shape of the elongate tube to urge the at least one electrode into contact with the pharyngeal mucosa.

14. The method of claim 1, wherein the at least one electrode comprises a flexible printed material.

15. The method of claim 1, wherein the at least one electrode comprises a pair of electrodes.

16. The method of claim 1, wherein the at least one electrode is positioned on an outer surface of the sleeve.

17. The method of claim 1, wherein the at least one electrode is ring-shaped.

18. The method of claim 1, wherein an extracorporeally positioned control unit is electrically coupled to the at least one electrode.

19. The method of claim 18, wherein the sleeve comprises a conducting wire with a proximal end coupled to the control unit and a distal end coupled to the at least one electrode.

20. The method of claim 1, wherein stimulating the sensory nerves comprises selectively varying an electrical current delivered to the pharynx via the at least one electrode.

* * * * *